United States Patent [19]

Swanson

[11] 4,110,226

[45] Aug. 29, 1978

[54] STABILIZED AQUEOUS GELS AND USES THEREOF

[75] Inventor: Billy L. Swanson, Bartlesville, Okla.

[73] Assignee: Phillips Petroleum Company, Bartlesville, Okla.

[21] Appl. No.: 764,924

[22] Filed: Feb. 2, 1977

[51] Int. Cl.² .......................... C09K 7/02; E21B 43/22; E21B 43/26
[52] U.S. Cl. ................................. 252/8.5 C; 166/275; 166/307; 166/308; 252/8.55 R; 252/8.55 D; 252/316
[58] Field of Search ............ 252/8.5 A, 8.5 C, 8.55 R, 252/8.55 D; 166/274, 275, 283, 308

[56] References Cited

U.S. PATENT DOCUMENTS

| | | | |
|---|---|---|---|
| 3,344,063 | 9/1967 | Stratton | 252/8.5 |
| 3,479,287 | 11/1969 | Floyd et al. | 252/8.5 |
| 3,699,042 | 10/1972 | Browning et al. | 252/8.5 |
| 3,727,687 | 4/1973 | Clampitt et al. | 166/274 |
| 3,727,688 | 4/1973 | Clampitt | 166/283 |

*Primary Examiner*—Herbert B. Guynn

[57] ABSTRACT

New improved aqueous gels, and methods of using same in contacting subterranean formations, are provided. Said gels are prepared by gelling an aqueous brine having incorporated therein a water-soluble cellulose ether such as a carboxymethylcellulose (CMC), and are rendered more stable to decomposition by incorporating a sulfoalkylated tannin stabilizing agent, such as a sulfomethylated quebracho (SMQ), in the gel during the preparation thereof.

14 Claims, No Drawings

STABILIZED AQUEOUS GELS AND USES THEREOF

This invention relates to new stabilized aqueous gels and uses thereof.

The secondary recovery of oil from oil-bearing or containing subterranean formations by fluid drive processes wherein a fluid is injected into the formation via one or more injection wells to drive the oil through the formation to one or more production wells is a well known process. Fluids used in such processes include liquids, such as water and various hydrocarbons, and gases such as hydrocarbon gases, carbon dioxide, etc. Many oil reservoirs comprise layers or zones of porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. It is known that excessive viscosity in the drilling fluid has an adverse effect on the penetration rate obtained by the drill bit. In many instances, substantially better rates can be secured by eliminating colloidal materials and reducing the viscosity of the drilling fluid. In some instances, air, clear water, or another similar fluid of low viscosity can be used in the place of the ordinary drilling fluid or mud.

The inventions disclosed and claimed in U.S. Pat. No. 3,727,687 and U.S. Pat. No. 3,900,406 provide a meritorious solution to the above-described problems. Said patents disclose and claim a class of aqueous gels which can comprise at least a portion of the aqueous medium used in said secondary recovery operations, the aqueous medium used in said well drilling operations, and the aqueous medium used in other oil field operations wherein a subterranean formation is contacted with an aqueous medium. According to said patents, water-soluble cellulose ethers when used in combination with a water-soluble compound of a polyvalent metal which can be reduced to a lower polyvalent valence state and a suitable reducing agent capable of reducing said polyvalent metal to said lower polyvalent valence state can be used as gelling agents to gel aqueous mediums comprising water. By varying the composition and/or amounts of said gelling agents, and/or the conditions under which they are used in forming the gels, a wide range of aqueous gels ranging from liquid highly mobile gels to rigid gels can be produced.

Stable gels can be prepared in accordance with said U.S. Pat. Nos. 3,727,687 and 3,900,406 when using brines as the starting aqueous medium. However, depending upon the brine composition and/or concentration, and the properties desired in the final gel, it is sometimes difficult to prepare gels of the desired stability with the desired certainty of success. It has now been discovered that sulfoalkylated tannins can be used as stabilizing agents for said gels. In the practice of the present invention, said sulfoalkylated tannins are incorporated into the gel during the preparation thereto to provide gels having an improved stability to decomposition, e.g., gels having an increased gel life.

Thus, the present invention is an improvement over the inventions disclosed and claimed in said U.S. Pat. Nos. 3,727,687 and 3,900,406.

According to the present invention, there is provided in a method wherein a fluid medium is introduced into a borehole in the earth and into contact with a subterranean formation penetrated by said borehole, the improvement wherein at least a portion of said fluid medium comprises an aqueous gel, and wherein said gel comprises an aqueous brine having incorporated therein: a water-thickening amount of a water-soluble cellulose ether; a water-soluble compound of a polyvalent metal, wherein the valence state of the metal therein is capable of being reduced to a lower polyvalent valence state, in an amount which is sufficient to cause gelation of said water containing said cellulose ether when the valence of at least a portion of said metal is reduced to said lower valence state; a water-soluble reducing agent in an amount which is effective to reduce at least a portion of said metal to said lower valence state and cause said gelation with the formation of said gel; and a water-soluble sulfoalkylated tannin capable of, and in an amount sufficient for, increasing the stability of said gel to decomposition, with said amount being sufficient to provide a weight ratio of the amount of said sulfoalkylated tannin to the amount of said polyvalent metal compound which is effective to cause said sulfoalkylated tannin to be effective in increasing the stability of said gel; and wherein said amount of said cellulose ether is sufficient to provide a weight ratio of the amount of said cellulose ether to the amount of said polyvalent metal compound which is also effective to cause said sulfoalkylated tannin to be effective in increasing the stability of said gel.

Further according to the present invention, there is provided an aqueous gel, suitable for use as at least a portion of a fluid medium in a process wherein a said fluid medium is introduced into a borehole in the earth and into contact with a subterranean formation penetrated by said borehole, said gel comprising an aqueous brine having incorporated therein: a water-thickening amount of a water-soluble cellulose ether; a water-soluble compound of a polyvalent metal, wherein the valence state of the metal therein is capable of being reduced to a lower polyvalent valence state, in an amount which is sufficient to cause gelation of said water containing said cellulose ether when the valence of at least a portion of said metal is reduced to said lower valence state; a water-soluble reducing agent in an amount which is effective to reduce at least a portion of said metal to said lower valence state and cause said gelation with the formation of said gel; and a water-soluble sulfoalkylated tannin capable of, and in an amount sufficient for, increasing the stability of said gel to decomposition, with said amount being sufficient to provide a weight ratio of the amount of said sulfoalkylated tannin to the amount of said polyvalent metal compound which is effective to cause said sulfoalkylated tannin to be effective in increasing the stability of said gel; and wherein said amount of said cellulose ether is sufficient to provide a weight ratio of the amount of said cellulose ether to the amount of said polyvalent metal compound which is also effective to cause said sulfoalkylated tannin to be effective in increasing the stability of said gel.

In general, any of the water-soluble cellulose ethers can be used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in the practice of the invention can vary widely depending upon the viscosity grade and purity of the ether, and properties desired in the aqueous gels of the invention. In general, the amount of cellulose ether used will be a water-thickening amount, i.e., at least an amount which will significantly thicken the brine to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 40 ppm the viscosity increase is about 45 percent. At 100 ppm the viscosity increase is about 195 percent. Generally speaking, amounts in the range of from 0.0025 to 10, preferably from 0.01 to 5, more preferably 0.025 to 1, weight percent, based on the weight of brine, can be used. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce stiff rigid gels. If desired, said stiff gels can be "thinned" by dilution to any desired concentration of cellulose ether. This can be done by mechanical means, e.g., stirring, pumping, or by means of a suitable turbulence inducing device to cause shearing, such as a jet nozzle. Thus, there is really no fixed upper limit on the amount of cellulose ether which can be used. However, when a liquid mobile gel is desired, it is preferred to dilute the more concentrated gels before they become rigid.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from $+7$ valence to $+4$ valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of cellulose ether used, the concentration of the cellulose ether in the brine to be gelled, the brine which is used, and the type of gel product desired. For similar reasons, the upper limit on the concentration of the starting metal-containing compound also cannot always be precisely defined. However, it should be noted that excessive amounts of the starting metal compound, for example $+6$ chromium, which can lead to excessive amounts of $+3$ chromium when there is sufficient reducing agent present to reduce the excess $+6$ chromium, can adversely affect the stability of the gels produced. As a general guide, the amount of the starting polyvalent metal-containing compound used in preparing aqueous gels in accordance with the invention will be in the range of from 0.05 to 30, preferably 0.5 to 20, weight percent of the amount of the cellulose ether used. Stated another way, the amount of the starting polyvalent metal-containing compound used will usually be an amount sufficient to provide at least about $3 \times 10^{-3}$, preferably at least $3 \times 10^{-5}$, gram atoms of said metal capable of being reduced per gram of cellulose ether. Preferably, the amount of said metal capable of being reduced which is used will not exceed $4 \times 10^{-3}$, more preferably $2 \times 10^{-3}$, gram atoms of said metal per gram of cellulose ether. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure.

Surprisingly, as discussed further hereinafter, it has been discovered that when the sulfoalkylated tannin stabilizing agents are used in the practice of the invention, there is a relationship between the amount of cellulose ether used and the amount of polyvalent metal compound gelling agent used. This relationship is best expressed as the weight ratio of the amount of said cellulose ether to the amount of said polyvalent metal compound, for example, the CMC:sodium dichromate ratio. For convenience, said ratio is referred to in the examples hereinafter as the CMC/DiCr ratio. Said relationship should be taken into consideration in the practice of the invention in order to obtain the best results. Thus, for best results, the ratio of the amount of cellulose ether to the amount of polyvalent metal should be at least about 20:1, preferably in the range of about 20:1 to about 150:1, more preferably in the range of about 25:1 to about 100:1. The discovery of said relationship, in addition to or apart from the amount of sulfoalkylated tannin used, was indeed surprising. The reason for the existence of said relationship is not presently understood.

Suitable reducing agents which can be used in the practice of the invention include sulfur-containing compounds such as sodium or potassium sulfite, sodium or potassium hydrosulfite, sodium or potassium metabisulfite, sodium or potassium bisulfite, sodium or potassium sulfide, sodium or potassium thiosulfate, hydrogen sulfide, thioacetamide, and others; and nonsulfur-containing compounds such as hydroquinone, p-hydrazinobenzoic acid, hydrazine phosphite, hydrazine dichloride, and others. Some of the above reducing agents act more quickly than others, for example, the thiosulfates usually react slowly in the absence of heat, and sometimes require heating to about 125°–130° F. The presently more preferred reducing agents are the sodium or potassium hydrosulfites, or the sodium or potassium metabisulfites.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the brine, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Tannins which can be used in preparing the sulfoalkylated tannins used in the practice of the invention are the vegetable tannins, including both the gallotannins and the flavotannins (sometimes called catechol tannins). Thus, the word "tannin" as used herein and in the claims, unless otherwise specified, refers to and includes the vegetable gallotannins and the vegetable flavotannins. Examples of the gallotannins include: tannic acid or Chinese tannin; Turkish tannin; Hamamelis tannin; Acer-tannin; Glucogallin; Sumac tannin; Valonia oak gall tannin; tea tannin; Tara; Myrabolam; Divi-Divi; Algarobillo; oak; and chestnut. Examples of flavotannins include: Gambier and Catechu or Burma Cutch; quebracho; Tizerah; Urunday; wattle, mangrove; spruce; hemlock; larch; willow; and Avaram. Said flavotannins are the presently preferred tannins for use in accordance with the invention.

Quebracho is the presently most preferred tannin. Quebracho is extracted from the bark and wood of the quebracho tree with water. The conventional method of preparing quebracho is to disintegrate the wood and bark, extract the bark and/or wood with water, the solution of quebracho and water is evaporated to 85 percent concentration of quebracho and the concentrated quebracho is spray dried. Quebracho is the commercial catechol tannin or flavotannin product. The high tannin content (about 20 percent) of the wood of the quebracho tree makes it the important source of catechol tannins. The principal source of gallotannins is gall nuts.

The sulfoalkylated tannin, either a gallotannin or a flavotannin, can be prepared by several different procedures. All of said procedures involve the inter-reaction, in an alkaline aqueous reaction medium under reaction conditions, between a tannin compound, a carbonyl compound selected from the group consisting of aldehydes and ketones, and a sulfur compound selected from the group consisting of sulfurous acid and water-soluble salts thereof. Thus, in one method an alkali metal hydroxide, e.g., sodium hydroxide, an aldehyde or ketone, e.g., formaldehyde or acetone, a sulfite, e.g., sodium sulfite or sodium bisulfite, and a tannin, e.g., quebracho (quebracho extract), are added to water in a reaction vessel to form a reaction mixture. The sequence of adding said reactants to the water is not critical. However, it is sometimes preferred to add the alkali metal hydroxide first. The amount of alkali metal hydroxide employed will be an amount sufficient to make the reaction mixture alkaline, at least initially. Said reaction mixture is then maintained under conditions of time and temperature sufficient to cause the substantial conversion of the tannin compound into a sulfoalkylated tannin.

If desired, the carbonyl compound, e.g., formaldehyde or acetone, and the sulfite can be prereacted. Thus, in one method, for example, a solution containing formaldehyde and sodium sulfite is prepared separately and then combined with the other reactants in the alkaline reaction medium.

In one preferred method, an alkaline first solution is prepared by dissolving a tannin (such as quebracho extract), and an alkali metal hdyroxide (such as sodium hydroxide) in water. A second solution is formed by admixing a carbonyl compound (such as formaldehyde) and a sulfite (such as sodium bisulfite) in water. Said second solution is then added to said first solution to form a third solution. Said third solution is then maintained at an elevated temperature for a period of time sufficient for at least a substantial portion of said aldehyde and said sulfite to react with said tannin to form a sulfoalkylated tannin.

In another preferred method the desired amount of water is added to a reactor vessel equipped with suitable stirring means. The desired amount of carbonyl compound (such as formaldehyde) is then added to said water with stirring. The desired amount of a sulfite (such as sodium bisulfite) is then added to the water, with stirring, and the carbonyl compound and sulfite are permitted to react to completion. Usually the reaction time will be within the range of 0.5 to 3 hours and the final temperature will be in the order of 125° F., depending upon the initial ambient temperature of the water, the amount of reagents, etc. The desired amount of an alkali metal hydroxide (such as sodium hydroxide) is then added. The tannin compound (such as quebracho) is then added to the tank containing the above reagents with vigorous stirring. Heating is initiated and the solution is maintained at an elevated temperature which is preferably within the range of 180° to 200° F. for a period of from 1 to 6 hours. After the sulfoalkylation reaction is complete the sulfoalkylated tannin is recovered from the reaction solution in any suitable manner, such as by drum drying, or spray drying.

In all of the above methods, the sulfoalkylated tannin can be recovered from the reaction mixture by any suitable method such as evaporation, drum drying, spray drying, etc. It is not essential to recover said sulfoalkylated tannin from the reaction mixture. Said reaction mixture can be used per se in liquid form in the practice of the invention. However, it is preferred to recover and dry said products. The dried solids can then be bagged and shipped to the field for use as described herein.

The vegetable tannins are high molecular weight materials having molecules of complex structure containing phenolic hydroxyl groups. Some authorities consider said tannins to be mixtures of polyphenolic substances. So far as is known all of said tannins contain at least one aromatic (e.g., benzene) ring having at least one phenolic hydroxyl group attached thereto. Said hydroxyl groups have their hydrogen atoms replaced in alkaline solution. The reactive sites remaining on the aromatic ring structure are susceptible to sulfoalkylation to add side chain(s) to the tannin molecule.

Due to the complex nature and chemistry of the tannin compounds it is not intended to limit the invention to the above or to any specific reaction mechanism, or to any specific method for preparing the sulfoalkylated tannins, which are used as in the practice of the invention. However, said sulfoalkylated tannins can be conveniently described in terms of processes for their manufacture. One reaction mechanism by which said sulfoalkylated tannin can be formed is as follows. The reaction involved is a sulfoalkylation reaction whereby the tannin molecule is alkylated by one or more sulfoalkylene radicals attached to said tannin molecule as side chains. The alkylene portion of said sulfoalkylene radical is a methylene or substituted methylene group. Thus, said side chain(s) can be represented by the formula

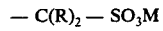

wherein each R is selected from the group consisting of a hydrogen atom and alkyl, cycloalkyl, aryl, and alkaryl radicals, and M is ammonium or an alkali metal depending upon the particular sulfite employed. As indicated hereinafter, it is preferred when R is other than hydrogen, that said R be an alkyl group containing from 1 to 5 carbon atoms.

As indicated above, the reactions involved in the preparation of the sulfoalkylated tannins used in the practice of the invention are carried out in an alkaline aqueous medium. Hydroxides of the alkali metals sodium, potassium, lithium, rubidium, and cesium can be used to make said medium alkaline. The amounts of said hydroxides used can be varied over a wide range. The principal function of said hydroxide is to impart sufficient initial solubility to the raw tannin so that it can react with the sulfite and aldehyde or ketone reactants. In order to obtain practical reaction rates for said reactions, the pH of the reaction medium should be about 10. In any event, enough of the hydroxide is used to make the initial pH of the reaction medium at least 7, and preferably 10 to 13. However, large excesses of the hydroxide above the amount required to initially solubilize the raw tannin should be avoided for best results. After the tannin has been sulfoalkylated it is not necessary that the reaction medium be alkaline. When sulfurous acid and a bisulfite are used as the sulfur compound, sufficient hydroxide should be present to convert these to the sulfite form. If desired, the alkali metal hydroxide can be prereacted with the tannin prior to the addition of the other reactants to the reaction medium.

Carbonyl compounds which can be used in preparing said sulfoalkylated tannins and metal complexes thereof include any aldehyde or ketone containing a $>C=O$ group, the carbon atom of which is capable of becoming a methylene or substituted methylene group. Thus, aldehydes and ketones which can be used can be represented by the formula $(R)_2CO=O$ wherein R is as defined above. Since said R is non-functional in the reaction, there is no real limit on what it is or the number of carbon atoms which it contains. However, when R is unduly large, solubility problems in the aqueous reaction medium and also in connection with the solubility of the reaction product are encountered. The larger R groups tend to make the product hydrophobic. In general, this is undesirable when the products are used in the additives of the invention. Thus, since it is preferred to carry out the reaction in an aqueous medium, it is preferred as a practical matter that when R is not hydrogen, it is an alkyl group containing from 1 to 5 carbon atoms, more preferably 1 to 3 carbon atoms.

Examples of said preferred aldehydes and ketone include: formaldehyde, acetaldehyde, propionaldehyde, n-butyraldehyde, isobutyraldehyde, n-valeraldehyde, acetone, methyl ethyl ketone, diethyl ketone, methyl n-propyl ketone, and methyl isopropyl ketone.

The sulfur compound used in preparing said sulfoalkylated tannins is, in general, sulfurous acid and its water-soluble salts such as the alkali metal salts and including the ammonium salts. The alkali metal (as defined above) sulfites are preferred. It is pointed out that when a bisulfite or sulfurous acid is added to the alkaline reaction medium, it will be converted to a sulfite. Therefore, herein and in the claims, unless otherwise designated, the term "sulfite" is employed generically to include sulfurous acid and bisulfites which, when added to the alkaline reaction medium, will be converted to and react as sulfites.

The amounts of the above-described reactants which are used are not critical. So long as a significant amount of each of said reactants is present, the desired reactions will proceed to some extent and some yield of sulfoalkylated tannin will be obtained. The amounts of each reactant used will depend upon the amount, the kind of tannin, and the percentage of conversion of said tannin which is desired. For results approaching the optimum, it is preferred to use amounts of said reactants which are within the range of from 0.5 to 1.5 times the stoichiometric equivalent amount of each reactant which is required to completely react the tannin. Amounts of said reactants which are less than stoichiometric result in less than 100 percent conversion. Amounts in excess of stoichiometric result in a waste of material. Thus, it is preferred to use substantially stoichiometric equivalent amounts of said reactants. For example, the amount of sulfite and aldehyde or ketone is preferably the stoichiometric equivalent amount required in the sulfoalkylation reaction. When the aldehyde or ketone and the sulfite are prereacted, they are preferably prereacted in stoichiometric equivalent amounts.

From the above it is seen that specific numerical ranges for the amounts of said reactants will be of only limited value in teaching this invention and it is to be understood the invention is not limited to any such specific numerical ranges. Those skilled in the art can readily determine from a few pilot experiments the stoichiometric amounts of reactants required for the particular tannin being reacted. However, as an aid to those less skilled in the art, the following ranges are set forth.

TABLE A (Amounts of Reagents Per 100 lbs. of Tannin)

| Reagent | Broad Range, lbs. | Preferred Range, lbs. | Preferred range for Quebracho, lbs. |
|---|---|---|---|
| Alkali metal hydroxide | 5 to 60 | 10 to 20 | 12 to 18 |
| Sulfite | 4 to 115 | 20 to 70 | 35 to 65 |
| Aldehyde or ketone | 1 to 60 | 5 to 50 | 15 to 36 |

The above preferred amounts of reactants can be stated in other ways. For example, when quebracho extract is the tannin being used, quebracho catechin is considered to be the active ingredient of the quebracho. Based on a molecular weight of 274 for said quebracho catechin, 100 pounds of quebracho extract will contain an average of 0.33 pound mol of quebracho catechin, and the preferred range of reagents given in column 3 of the above Table A has been established on this basis. When other tannin materials are used, the molecular weight of the active ingredient thereof, as well as the amount contained per 100 pounds of tannin, may be different. Thus, it is desirable that the quantities of reagents to be used be established for each particular tannin material used. Those skilled in the art will have no difficulty establishing the amounts of reagents to use in view of this disclosure. Any large deviation from the 0.33 mol of active ingredient in any individual lot of quebracho extract would also require an adjustment of the chemicals used for reacting with said quebracho. However, analyses of commercially available quebracho extracts available from different sources has shown that commercial quebracho extract is surprisingly uniform in composition.

The amount of carbonyl compound, e.g., formaldehyde, and the amount of sulfite compound, e.g., sodium bisulfite, used in the reaction will determine the amount of sulfoalkylation of the tannin compound which occurs. This affords another way of expressing the amount of carbonyl compound and sulfite. The amount of sulfoalkylation which occurs in any given reaction situation can be expressed in terms of the parts by weight of the carbonyl compound-sulfite addition product or sulfoalkylation reagent, e.g., $NaSO_3CH_2OH$—formed by reacting stoichiometric amounts of formaldehyde and sodium bisulfite, used per 200 parts by weight of tannin. For example, expressed in this manner and when using formaldehyde, sodium bisulfite, and quebracho, the preferred amounts of sodium formaldehyde bisulfite addition product will be within the range of from about 30 to about 190, more preferably about 140 to about 160, parts by weight of the sulfomethylation reagent per 200 parts by weight of quebracho. The amount of said addition product incorporated into the tannin molecule thus affords one method of expressing the degree of sulfoalkylation (DSA) of the tannin. Most commonly, as indicated above, the sulfoalkylation reaction will comprise a sulfomethylation reaction, and the degree of sulfoalkylation becomes degree of sulfomethylation (DSM) as used in the examples hereinafter.

In general, the reaction conditions are not critical. All the reactions involved in preparing said sulfoalkylated tannins will take place at ordinary room temperatures (70°–80° F.) but at a reduced rate and all reaction conditions at which the reactions will take place are within the scope of the invention. However, as a practical matter, it is preferred to employ elevated temperatures to cause said reactions to take place in less time. Any suitable temperature below the decomposition temperature of the tannin can be employed. For example, the application of heat aids in dissolving quebracho in the alkaline medium. As a general rule, temperatures in the order of 125° to 212° F. are sufficient. However, usually a more preferred range is from 180° to 212° F. If desired, the reaction mixture can be refluxed at atmospheric pressure, or can be heated in an autoclave under superatmospheric pressure to obtain higher temperatures. In general, the maximum temperatures employed will be in the order of 300° F. Thus, an overall numerical range for the reaction temperatures can be said to be from 70° to 300° F.

The reaction time will be dependent upon the reaction temperature employed. Reaction times in the order of 0.5 to 10 hours have been found quite sufficient. Preferably, the reaction times will be within the range of 1 to 6, more preferably 1 to 4, hours.

Any suitable amount of sulfoalkylated tannin which is effective to increase the gel stability can be used in the practice of the invention. However, it was surprising to discover that there is apparently both a minimum and a maximum amount of sulfoalkylated tannin which can be used. In other words, depending upon the other components and the amounts thereof in the gels, there is a minimum amount below which, and a maximum amount above which, said sulfoalkylated tannins are not effective in increasing the stability of the gels. It has been discovered that the amount of sulfoalkylated tannin to be used in the practice of the invention can be conveniently expressed in terms of the weight ratio of the amount of the sulfoalkylated tannin to the amount of the polyvalent metal compound used, as for example, when sulfomethylated quebracho (SMQ) is used, the SMQ:sodium dichromate ratio. For convenience, said ratio is referred to in the examples hereinafter as the SMQ/DiCr ratio. It has been found that values of said ratio within the range of from about 6.5:1 to about 27.5:1, preferably about 10:1 to about 20:1, are suitable for use in the practice of the invention.

As mentioned above, it was surprising to discover the existence of a relationship between the amount of cellulose ether, e.g., CMC, and the amount of the polyvalent metal compound used, e.g., sodium dichromate, used in the practice of the invention. Thus, for best results in the practice of the invention, the amount of sulfoalkylated tannin used should be an amount sufficient to provide a weight ratio of the amount of said sulfoalkylated tannin to the amount of the polyvalent metal compound which is effective to cause said sulfoalkylated tannin to be effective in increasing the stability of the gel; and the amount of the cellulose ether used should be an amount which is sufficient to provide a weight ratio of the amount of said cellulose ether to the amount of the polyvalent metal compound which is also effective to cause the sulfoalkylated tannin to be effective in increasing the stability of the gels. Thus, both of the above-discussed ratios should be considered in the practice of the invention.

Any suitable brine can be used in the practice of the invention. As shown by the examples given hereinafter, the sulfoalkylated tannin stabilizing agents of the invention have been found to be effective in brines having a total dissolved solids (TDS) content of from about 22,000 to about 303,000 parts per million by weight. Oil field brines commonly contain varying amounts of sodium chloride, calcium chloride, magnesium chloride, etc. as well as other cations and anions. Sodium chloride is usually present in the greatest concentration. Based on the data set forth in the examples hereinafter, it has been concluded that divalent cations such as calcium, magnesium, and barium ions have an undesirable effect on the capability of the sulfoalkylated tannins for stabilizing the gels. Thus, depending upon the TDS content of the brine being used, it is preferred that the brine not have more than about 4,000–5,000 ppm of said divalent cations.

The aqueous gels of the invention are particularly useful in operations wherein a fluid medium is introduced into a borehole in the earth, e.g., in the above-described secondary recovery operations, in the above-described well drilling operations, in well completion operations, as packer fluids, etc.

The aqueous gels of the invention can be used for treating or contacting subterranean formations in accordance with any of the techniques set forth in said U.S. Pat. No. 3,727,687. Said gels can also be used for fracturing, or fracture-acidizing of, subterranean formations in accordance with the techniques set forth in U.S. Pat. No. 3,727,688. Said gels can also be used for plugging or sealing of fractures in subterranean formations in accordance with the techniques set forth in U.S. Pat. No. 3,845,822.

The following examples will serve to further illustrate the invention, but are not to be considered as unduly limiting on the invention. In carrying out said examples, the following general procedure was employed.

The components of the gel compositions of the invention can be mixed in any suitable order. In the following examples the preferred procedure was followed. This comprised adding the sulfoalkylated tannin as a solid to a stirred solution of the cellulose ether in a brine. This was followed by the addition of a polyvalent metal compound, e.g., sodium dichromate, and a reducing agent, e.g., sodium hydrosulfite. Apparent viscosities and gel strengths were then determined after the gel had been aged for one hour at room temperature, and again after the gel had been aged about 14 hours at 120° F. Said apparent viscosities were determined by employing a Model 35 Fann Viscometer. Said gel strengths were prepared in accordance with API Procedure RP13B, Second Edition, April 1969. In the majority of instances, the procedure followed was to prepare stock solutions containing 5,000 ppm of sodium CMC in various designated brines having different total dissolved solids (TDS) contents. Aliquot portions, e.g., 250 milliliters, of said stock solution were then used in preparing the samples used in the test runs. To said aliquots there was added, with stirring, specified amounts of the solid sulfoalkylated tannin, e.g., 1.25 grams of sulfomethylated quebracho (SMQ), which is equivalent to 5,000 ppm per 250 milliliters of polymer solution. To the resulting solution there was then added designated amounts, e.g., 0.5 milliliter of a 100,000 ppm stock solution of $Na_2Cr_2O_7.2H_2O$, with stirring, followed by the addition of designated amounts of a reducing agent, e.g., 0.5 milliliter of a 100,000 ppm stock solution of $Na_2S_2O_4.2H_2O$. The samples were then tested as indicated in the following examples.

A synthetic 90,000 ppm TDS brine was prepared by dissolving 66.6 grams of sodium chloride, 15.3 grams of calcium chloride, 5.1 grams of magnesium chloride, and 1.55 grams of barium chloride in 1 liter of deionized water. This brine was used to prepare a 22,500 ppm and a 45,000 ppm brine by dilution with deionized water. A brine of approximately 180,000 ppm TDS was prepared by dissolving 133.2 grams of sodium chloride, 30.6 grams of calcium chloride, 10.2 grams of magnesium chloride, and 3.1 grams of barium chloride in 1 liter of deionized water. This brine was then used to prepare other brines containing 135,000 ppm TDS and 157,500 ppm TDS by dilution with deionized water.

EXAMPLE I

A series of runs was carried out to illustrate the effect of sulfoalkylated tannin as a gel stabilizing agent. A primary purpose of this series of runs was to illustrate the effect of the sulfoalkylated tannin/polyvalent metal ratio, e.g., herein expressed as the SMQ/DiCr ratio. In this series of runs varying amounts of sulfomethylated quebracho (SMQ) having a DSM of 150 was added as a stabilizing agent during the preparation of the gels from a polymer solution containing 5,000 ppm of CMC-9 (a commercially available sodium carboxymethyl cellulose), 200 ppm of $Na_2Cr_2O_7.2H_2O$, and 200 ppm of $Na_2S_2O_4.2H_2O$ in said synthetic 90,000 ppm TDS brine. In these runs the concentration of the polymer, the sodium dichromate, the sodium hydrosulfite, and the brine were maintained constant; only the concentration of the SMQ was varied. Gel strengths and apparent viscosities were determined as described above. Details and results from the runs are set forth in Table I below.

TABLE I

Effect of SMQ/DiCr Ratio on Gel Stability

| Run No. | SMQ ppm | Ratio SMQ DiCr | Ratio CMC DiCr | Apparent Viscosity(cp)& Gels[b] After One Hour At R.T. | | | Apparent Viscosity(cp)& Gels[b] After 14 Hours at 120° F | | | Vol.% Syneresis After 14 Hours at 120° F |
|---|---|---|---|---|---|---|---|---|---|---|
| | | | | 10.2 Sec$^{-1}$ | 5.1 Sec$^{-1}$ | Gels | 10.2 Sec$^{-1}$ | 5.1 Sec$^{-1}$ | Gels | |
| 1 | 1000 | 5:1 | 25:1 | 2850 | 4300 | 37/175 | 0 | 0 | 1/7 | 8 |
| 2 | 2000 | 10:1 | 25:1 | 1100 | 1700 | 21/77 | 2600 | 2900 | 26/35 | Trace |
| 3 | 3000 | 15:1 | 25:1 | 550 | 900 | 11/47 | 2800 | 4200 | 39/47 | 0 |
| 4 | 3000 | 15:1 | 25:1 | 1550 | 2100 | 27/98 | 1300 | 2000 | 20/37 | 0 |
| 5 | 4000 | 20:1 | 25:1 | 200 | 300 | 4/23 | 2400 | 3700 | 39/50 | 0 |
| 6 | 5000 | 25:1 | 25:1 | 150 | 200 | 2/6 | 1150 | 1900 | 16/37 | 0 |
| 7 | 6000 | 30:1 | 25:1 | 150 | 200 | 2/11 | 0 | 0 | 0/0 | 0 |
| 8[a] | 0 | 0 | 25:1 | 600 | 800 | 14/81 | 0 | 0 | 0/0 | 22 |
| 9 | | | | | | | | | | |

[a] Control run.
[b] Gel strength, lb/100 sq.ft. (after being quiescent for 10 seconds and then 10 minutes - see API Procedure RP 13B Second Edition, April 1969).
DiCr = $Na_2Cr_2O_7 \cdot 2H_2O$ Referring to the above Table I, it is evident from the data there set forth that sulfoalkylated tannins, e.g., SMQ, do have a stabilizing effect on gels prepared from solutions of CMC in concentrated brines when using a polyvalent metal, e.g., sodium dichromate, and a reducing agent, e.g., sodium hydrosulfite, to prepare said gels. For example, the viscosities and gel strengths after 1 hour at room temperature, and the percent syneresis and the viscosities and gel strengths after 14 hours at 120° F., show that the gels of Runs 2-6 were more stable than the gels of Runs 1, 7, and 8. Said data also show that the quantity of sulfoalkylated tannin used is an important variable. Surprisingly, it was found that a definite relationship exists between the weight ratio of the sulfoalkylated tannin, e.g., SMQ, to the polyvalent metal compound, e.g., sodium dichromate. For example, said data show that in Run 1 the SMQ/DiCr ratio of 5:1 was too small, and in Run 7 the SMQ/DiCr ratio of 30:1 was too great. Thus, based on the data in Table I, and other data herein, it is concluded that in the practice of the invention the sulfoalkylated tannin should be used in an amount sufficient to provide a ratio of sulfoalkylated tannin to polyvalent metal compound which is within the range of from about 6.5:1 to about 27.5:1, preferably about 10:1 to about 20:1.

EXAMPLE II

Another series of test runs was carried out wherein a primary purpose was to illustrate the effect of the TDS content of the brine used in the practice of the invention. Said runs were carried out in essentially the same manner and using a 5,000 ppm polymer solution, 200 ppm of sodium dichromate, and 200 ppm of sodium hydrosulfite, as in Example I. In all the runs where it was used, the quantity of the SMQ used was held constant at 3,000 ppm. Only the brine concentrations were varied, i.e., from 22,500 ppm to 157,500 ppm TDS. Gel strengths and apparent viscosities were measured as in Example I. Further details and the results from said runs are set forth in Table II below.

TABLE II

Effect of Brine Concentration on SMQ Gel Stabilization

| Run No. | SMQ ppm | Brine Conc. TDS, ppm | Ratio SMQ DiCr | Ratio CMC DiCr | Apparent Viscosity(cp)&Gels[b] After One Hour At R.T. | | | Apparent Viscosity(cp)&Gels[b] After 14 Hours At 120° F | | | Vol.% Syneresis After 14 Hours at 120° F |
|---|---|---|---|---|---|---|---|---|---|---|---|
| | | | | | 10.2 Sec$^{-1}$ | 5.1 Sec$^{-1}$ | Gels | 10.2 Sec$^{-1}$ | 5.1 Sec$^{-1}$ | Gels | |
| 9[a] | 0 | 22500 | 0 | 25:1 | 6450 | 10100 | N.M.[c] | 250 | 400 | 7/13 | 2 |
| 10 | 3000 | 22500 | 15:1 | 25:1 | 2000 | 3500 | N.M.[c] | 1700 | 3200 | 33/64 | 0 |
| 11[a] | 0 | 45000 | 0 | 25:1 | 5450 | 7600 | N.M.[c] | 30 at 171 Sec$^{-1}$ | N.M.[c] | N.M.[c] | 6 |
| 12 | 3000 | 45000 | 15:1 | 25:1 | 2700 | 4300 | N.M.[c] | 2700 | 4500 | 49/66 | Trace |
| 13[a] | 0 | 90000 | 0 | 25:1 | 600 | 800 | 14/81 | 0 | 0 | 0/0 | 22 |
| 14 | 3000 | 90000 | 15:1 | 25:1 | 1550 | 2100 | 27/98 | 1300 | 2000 | 20/37 | 0 |
| 15[a] | 0 | 135000 | 0 | 25:1 | 400 | 700 | N.M.[c] | N.M.[c] | N.M.[c] | N.M.[c] | 28 |
| 16 | 3000 | 135000 | 15:1 | 25:1 | 1550 | 1500 | N.M.[c] | N.M.[c] | N.M.[c] | N.M.[c] | 16 |
| 17[a] | 0 | 157500 | 0 | 25:1 | 250 | 500 | N.M.[c] | N.M.[c] | N.M.[c] | N.M.[c] | 56 |
| 18 | 3000 | 157500 | 15:1 | 25:1 | 350 | 400 | N.M.[c] | N.M.[c] | N.M.[c] | N.M.[c] | 16 |

[a] Control runs.
[b] Gel strength, lb/100 sq. ft. (after being quiescent for 10 seconds and then 10 minutes; see API Procedure RP 13B Second Edition, April 1969).
[c] N.M. represents "not measured", or "No measurable" viscosity, respectively, for the gels and viscosities. DiCr = $Na_2Cr_2O_7 \cdot 2H_2O$ Referring to the above Table II, it is evident from the data there set forth that the brine concentration (TDS, ppm) has an effect on the stability of gels stabilized with a sulfoalkylated tannin, e.g., SMQ. For example, comparing runs 10, 12, 14, 16 and 18, and their respective control runs 9, 11, 13, 15, and 17 wherein no SMQ was used, it will be noted that the SMQ was less effective as a stabilizing agent as the concentration of the brine increased. This was particularly true at brine concentrations of 135,000 TDS content and greater. Thus, based on the data in said Table II it is concluded that the brine concentration should be taken into consideration in the practice of the invention.

EXAMPLE III

Another series of runs was carried out to further investigate the effect of brine concentration in the practice of the invention. Upon consideration of the data in the above Table II, it was believed likely that the brine composition, e.g., the concentration of the divalent cations such as calcium ion, also had an effect on the stabilizing capacity of sulfoalkylated tannins, e.g., SMQ, in the practice of the invention. Thus, in this series of runs a field brine from West Texas was used. This brine had a TDS content of approximately 303,000 ppm. Said brine contained 185,000 ppm of chloride ion (measured), 760 ppm calcium ion (measured), 2,230 ppm of magnesium ion (calculated on a total hardness of 4500 ppm on the basis of calcium ion), and 115,000 ppm of sodium ion (by difference). Otherwise, the gel samples in said runs were prepared in essentially the same manner using a polymer solution containing 5,000 ppm of CMC-9, 200 ppm of sodium dichromate, and 200 ppm of sodium hydrosulfite, as in the above Examples I and II. Gel strengths and apparent viscosities on the resulting gels were determined as in said other examples. Further details and the results of said run are set forth in Table III below.

hydrosulfite. The brine used was the above-described 90,000 TDS brine. Each of the gel samples was then heated to 150° F in a Fann Model 50C viscometer and the apparent viscosity was measured during and after said heating. Further details and the results of said runs are set forth in Table IV below.

TABLE III

Effect of Brine Concentration on SMQ Gel Stabilization

| Run No. | SMQ ppm | Brine Conc. TDS[c],ppm | Ratio SMQ DiCr | Ratio CMC DiCr | Apparent Viscosity(cp)&Gels[b] After One Hour At R.T. | | | Apparent Viscosity(cp)&Gels[b] After 14 Hours at 120° F | | | Vol.% Syneresis After 14 Hours at 120° F |
|---|---|---|---|---|---|---|---|---|---|---|---|
| | | | | | 10.2 Sec$^{-1}$ | 5.1 Sec$^{-1}$ | Gels | 10.2 Sec$^{-1}$ | 5.1 Sec$^{-1}$ | Gels | |
| 19[a] | 0 | 303,000 | 0 | 25:1 | 1050 | 1200 | 21/41 | 450 | 800 | 10/22 | 3 |
| 20 | 3000 | 303,000 | 15:1 | 25:1 | 1050 | 1800 | 17/60 | 400 | 600 | 2/9 | 0 |

[a]Control run.
[b]Gel strength, lb./100 sq. ft. (after being quiescent for 10 seconds and then 10 minutes: see API Procedure RP 13B Second Edition, April 1969).
[c]Approximate: 760 ppm Ca$^{++}$, 185,000 ppm Cl$^-$, 2,230 ppm Mg$^{++}$, and 115,000 ppm Na$^+$. DiCr = Na$_2$Cr$_2$O$_7$ . 2H$_2$O

TABLE IV

Effect of Temperature on SMQ Stabilized Gels

| Run No. | SMQ ppm | Ratio SMQ DiCr | Ratio CMC DiCr | MAXIMUM APPARENT VISCOSITIES OBSERVED (cp) | | | |
|---|---|---|---|---|---|---|---|
| | | | | During Heating to 150° F | After Reaching 150° F | After Holding at 150° F for 20 Min. | After Cooling To Ambient Temperature |
| 21* | 0 | 0 | 25:1 | 31$^a$ | 2.5 | 2.0 | 3.7 |
| 22 | 3000 | 15:1 | 25:1 | 26.5$^a$ | 11 | 8≠ | 30 |
| 23* | 0 | 0 | 25:1 | 21$^b$ | 6 | 5 | 15.5 |

*Control runs.
≠This reading was taken after the sample was held at 150° F for 75 minutes.
$^a$These readings corresponded to 78° F.
$^b$This reading corresponded to 75° F.
DiCr = Na$_2$Cr$_2$O$_7$ . 2H$_2$O Referring to the above Table III, and comparing the data therein set forth with the data set forth in the above Table II, it is evident that the brine composition also has an effect on the stability of gels stabilized with a sulfoalkylated tannin, e.g., SMQ. For example, comparing Runs 19 and 20 with Runs 17 and 18 of Table II, it will be noted that the SMQ was significantly more effective as a stabilizing agent in said Runs 19 and 20 than in said Runs 17 and 18, even though the brine used in said Runs 19 and 20 had a TDS content of approximately 303,000 compared to a TDS content of about 157,500 for the brine used in said Runs 17 and 18. Thus, based on the data set forth in said Tables II and III, it is concluded that the brine composition should also be taken into consideration in the practice of the invention.

EXAMPLE IV

A series of runs was carried out to further investigate the effect of temperature on the stability of gelled solutions of cellulose ethers stabilized with a sulfoalkylated tannin, e.g., SMQ. In said runs the gel samples were prepaed in essentially the same manner as discussed in the above examples, using a starting polymer solution containing 5,000 ppm of CMC-9 and adding thereto 200 ppm of sodium dichromate and 200 ppm of sodium Referring to the above Table IV, it is evident that the unstabilized gels of Runs 21 and 23 underwent a greater percentage decrease in maximum apparent viscosity during the heat treatment and subsequent return to ambient temperature than did the stabilized gel of invention Run 22. Thus, based upon the data set forth in the above Table IV, it is concluded that sulfoalkylated tannins, e.g., SMQ, are effective stabilizers for, and impart increased thermal stability to, gelled solutions of cellulose ethers, e.g. CMC.

EXAMPLE V

Another series of runs was carried out to further investigate the effect of temperature on the stability of gelled solutions of cellulose ethers, e.g., CMC, stabilized with a sulfoalkylated tannin, e.g., SMQ. In said runs the gel samples were prepared and tested in essentially the same manner as described in the above Example IV, using a starting polymer solution containing 10,000 ppm of CMC-9, and adding thereto 400 ppm of sodium dichromate and 400 ppm of sodium hydrosulfite. The brine used was the above-described 22,500 TDS brine. Further details and the results of said runs are set forth in Table V below.

TABLE V

Effect of Temperature on SMQ Stabilized Gels

| Run No. | SMQ ppm | Ratio SMQ DiCr | Ratio CMC DiCr | MAXIMUM APPARENT VISCOSITIES OBSERVED (cp) | | | |
|---|---|---|---|---|---|---|---|
| | | | | During Heating to 200° F | After Reaching 200° F | After Holding at 200° F for 1 Hr. | After Cooling To Ambient Temperature |
| 24 | 1500 | 3.75:1 | 25:1 | 320$^b$ | 120 | 72 | 500 |
| 25 | 3000 | 7.5:1 | 25:1 | 230$^c$ | 220 | 172 | 385 |
| 26 | 6000 | 15:1 | 25:1 | 121$^d$ | 47 | 30 | 105 |
| 27$^a$ | 0 | 0 | 25:1 | 315$^d$ | 17 | 12 | 123 |

$^a$Control run.
$^b$This reading was taken at 132° F.
$^c$This reading was taken at 192° F.
$^d$These readings were taken at 82° F.
DiCr = Na$_2$Cr$_2$O$_7$ . 2H 2O Referring to the above Table V, it is evident that the stabilized gels of invention Runs 25 and 26 had more thermal stability than did the unstabilized control Run 27.

EXAMPLE VI

Other runs were carried out in which solutions containing 5000 ppm of CMC-9 in the above-described 90,000 ppm TDS content brine were gelled. These runs were carried out, and the resulting gels were tested, in substantially the same manner as described above in connection with Examples I–III, except that varying quantities of sodium dichromate, sodium hydrosulfite, and SMQ stabilizer were used. These runs illustrate the correlation between the ratios SMQ/DiCr and CMC/DiCr, in addition to other features of the invention, including variations in the type of sulfoalkylated tannin and the degree of sulfoalkylation thereof. Further details and results of said runs are set forth in Table VI below.

TABLE VI

Correlation Of The Ratios SMQ/DiCr and CMC/DiCr With Gel Stability

| No. | SMQ* | DiCr | Na$_2$S$_2$O$_4$ | Ratio DiCr | Ratio DiCr | Apparent Viscosity(cp)&Gels[b] 10.2 Sec$^{-1}$ | 5.1 Sec$^{-1}$ | Gels | Apparent Viscosity(cp)&Gels[b] 10.2 Sec$^{-1}$ | 5.1 Sec$^{-1}$ | Gels | Vol.% Syneresis at 120° F |
|---|---|---|---|---|---|---|---|---|---|---|---|---|
| 28 | 5000 | 500 | 100 | 10:1 | 10:1 | 2200 | 2100 | — | Remaining gel firm | | | 8 |
| 29 | 5000 | 500 | 200 | 10:1 | 10:1 | 3500 | 3900 | — | Remaining gel firm | | | 7 |
| 30 | 5000 | 500 | 300 | 10:1 | 10:1 | 5100 | 6700 | — | Remaining gel —10 | | | |
| 31 | 500 | 750 | 100 | 6.67:1 | 6.67:1 | 2900 | 4200 | — | Remaining gel firm | | | 16 |
| 32 | 5000 | 750 | 200 | 6.67:1 | 375 | 1350 | 1800 | — | Remaining gel firm | | | 14 |
| 33 | 5000 | 750 | 300 | 6.67:1 | 6.67:1 | 500 | 800 | — | Remaining gel firm | | | 22 |
| 34 | 5000 | 250 | 100 | 20:1 | 20:1 | 2350 | 3500 | — | 1950 | 2400 | 29/34 | 0 |
| 35 | 5000 | 250 | 200 | 20:1 | 20:1 | 2000 | 3100 | — | 2000 | 2500 | 29/57 | 0 |
| 36 | 5000 | 250 | 300 | 20:1 | 20:1 | 3000 | 4400 | — | 2350 | 2100 | 27/41 | 0 |
| 37[a] | 0 | 250 | 200 | 0 | 0 | 900 | 1800 | 19/153 | — | — | — | 34 |
| 38 | 1000 | 250 | 200 | 4:1 | 20:1 | 3150 | 3100 | 18/120 | — | — | — | 34 |
| 39 | 2000 | 250 | 200 | 8:1 | 20:1 | 3000 | 4100 | 30/82 | — | — | — | 8 |
| 40 | 3000 | 250 | 200 | 12:1 | 20:1 | 2200 | 3100 | 29/95 | 250 | 300 | 5/20 | 1 |
| 41 | 4000 | 250 | 200 | 16:1 | 20:1 | 1750 | 2800 | 37/120 | 1000 | 1400 | 22/39 | 0 |
| 42[a] | 0 | 375 | 300 | 0 | 0 | 1350 | 2500 | 33/160 | — | — | — | 40 |
| 43 | 1000 | 375 | 300 | 2.7:1 | 13.3:1 | 1000 | 1800 | 20/126 | — | — | — | 32 |
| 44 | 2000 | 375 | 300 | 5.3:1 | 13.1:1 | 3600 | 4900 | 28/201 | — | — | — | 32 |
| 45 | 3000 | 375 | 300 | 8.0:1 | 13.3:1 | 3400 | 4400 | 34/240 | — | — | — | 16 |
| 46 | 4000 | 375 | 300 | 10.7:1 | 13.3:1 | 2450 | 4000 | 33/232 | — | — | — | 2 |
| 47[a] | 0 | 500 | 400 | 0 | 0 | — | — | — | — | — | — | 48 |
| 48 | 1000 | 500 | 400 | 2:1 | 10:1 | — | — | — | — | — | — | 32 |
| 49 | 2000 | 500 | 400 | 4:1 | 10:1 | 1050 | 1800 | 26/138 | — | — | — | 28 |
| 50 | 3000 | 500 | 400 | 6:1 | 10:1 | 3750 | 3000 | 28/133 | — | — | — | 50 |
| 51 | 4000 | 500 | 400 | 8:1 | 10:1 | 1750 | 2500 | 22/128 | — | — | — | 16 |
| 52[a] | 0 | 100 | 100 | 0 | 0 | 1200 | 1600 | 30/102 | — | — | — | Much[c] |
| 53 | 1000 | 100 | 100 | 10:1 | 50:1 | 50 | — | 0/12 | 1900 | 2900 | 28/35 | 0 |
| 54 | 2000 | 100 | 100 | 20:1 | 50:1 | — | — | 0/0 | 1350 | 1800 | 18/40 | 0 |
| 55 | 3000 | 100 | 100 | 30:1 | 50:1 | — | — | 0/0 | 50 | — | 0/0 | 0 |
| 56 | 4000 | 100 | 100 | 40:1 | 50:1 | 50 | — | 0/0 | 50 | — | 0/0 | 0 |
| 57 | 1000 | 150 | 150 | 6.66:1 | 33.3:1 | 950 | 1400 | 18/97 | 1700 | 1700 | 26/38 | Trace |
| 58 | 2000 | 150 | 150 | 13.3:1 | 33.3:1 | 200 | 300 | 2/16 | 2750 | 4400 | 38/34 | 0 |
| 59 | 3000 | 150 | 150 | 20:1 | 33.3:1 | 50 | 100 | 0/4 | 2500 | 3900 | 36/46 | 0 |
| 60 | 4000 | 150 | 150 | 26.6:1 | 33.3:1 | 0 | — | 0/0 | 600 | 900 | 12/34 | 0 |
| 61 | 5000 | 150 | 150 | 33.3:1 | 33.3:1 | 100 | 100 | 1/1 | 150 | 100 | 2/2 | 0 |
| 62 | 3000 | 375 | 300 | 8:1 | 13.3:1 | 2900 | 4300 | 35/265 | 0 | 0 | 1/4 | 6 |
| 63 | 3000[d] | 375 | 300 | 8:1 | 13.3:1 | 1600 | 2300 | 24/95 | 2650 | 4100 | 35/44 | 0 |
| 64 | 3000[e] | 375 | 300 | 8:1 | 13.3:1 | 0 | 0 | 0/0 | 0 | 0 | 0/0 | 0 |
| 65 | 3000[f] | 375 | 300 | 8:1 | 13.3:1 | 0 | 0 | 0/0 | 0 | 0 | 0/0 | 0 |
| 66 | 3000[g] | 375 | 300 | 8:1 | 13.3:1 | 100 | 100 | 1/5 | 1350 | 2400 | 21/46 | 0 |
| 67 | 2000[d] | 150 | 150 | 13.3:1 | 33.3:1 | 50 | — | — | 0[h] | 0[h] | 0/0[h] | 0[h] |
| 68 | 3000[d] | 150 | 150 | 20:1 | 33.3:1 | 0 | 0 | 0/0 | 0[h] | 0[h] | 0/0[h] | 0[h] |
| 69 | 2000[d] | 200 | 200 | 10:1 | 25:1 | 150 | 1100 | 2/14 | 100[h] | 100[h] | 0/0[h] | 0[h] |
| 70 | 3000[d] | 200 | 200 | 15:1 | 25:1 | 50 | — | 0/0 | 0 | 0[h] | 0/0[h] | 0[h] |
| 71 | 2000[g] | 150 | 150 | 13.3:1 | 33.3:1 | 0 | 0 | 0/0 | — | 0[h] | 0/0[h] | 0[h] |
| 72 | 3000[g] | 150 | 150 | 20:1 | 33.3:1 | 0 | 0 | 0/0 | 0[h] | 0[h] | 0/0[h] | 0[h] |
| 73 | 2000[g] | 200 | 200 | 10:1 | 25:1 | 0 | 0 | 0/0 | 550[h] | 800[h] | 5/16[h] | 0[h] |
| 74 | 3000[g] | 200 | 200 | 15:1 | 25:1 | 0 | 0 | 0/0 | — | 0[h] | 0/0[h] | 0[h] |
| 75 | 2000 | 150 | 150 | 13.3:1 | 33.3:1 | 650[i] | 1200[i] | 13/57[i] | 0[h] | 0[h] | 0/0[h] | 0[h] |
| 76 | 3000 | 150 | 150 | 20:1 | 33.3:1 | 200[i] | 300[i] | 3/21[i] | 0[h] | 0[h] | 0/0[h] | 0[h] |
| 77 | 2000 | 200 | 200 | 10:1 | 25:1 | 2100[i] | 3100[i] | 36/235[i] | 100[h] | 100[h] | 1/8[h] | — |
| 78 | 3000 | 200 | 200 | 15:1 | 25:1 | 1250[i] | 1900[i] | 24/93[i] | 550[h] | 700[h] | 7/12[h] | 0[h] |
| 79 | 2000[g] | 200 | 200 | 10:1 | 25:1 | Good to fair gel | | | 1000 | 1500 | 15/22 | 0 |
| 80 | 2000[g] | 250 | 200 | 8:1 | 20:1 | Good to fair gel | | | 1450 | 1600 | 22/31 | 0 |
| 81 | 2000[g] | 375 | 300 | 5.3:1 | 13.3:1 | Good to fair gel | | | 450 | 900 | 9/42 | 1 |
| 82 | 3000[g] | 250 | 200 | 12:1 | 20:1 | Good to fair gel | | | 1000 | 1600 | 11/21 | 0 |
| 83 | 3000[g] | 375 | 300 | 8:1 | 13.3:1 | Good to fair gel | | | 1250 | 1600 | 17/32 | 0 |
| 84 | 3000[g] | 500 | 400 | 6:1 | 10:1 | Good to fair gel | | | 450 | 800 | 8/31 | Trace |
| 85 | 2000[d] | 200 | 200 | 10:1 | 25:1 | Good to fair gel | | | 950 | 1500 | 12/25 | 0 |
| 86 | 2000[d] | 250 | 200 | 8:1 | 20:1 | Good to fair gel | | | 900 | 1200 | 24/35 | 0 |
| 87 | 2000[d] | 375 | 300 | 5.3:1 | 13.3:1 | Good to fair gel | | | 150 | 300 | 3/10 | 1 |
| 88 | 3000[d] | 250 | 200 | 12:1 | 20:1 | Good to fair gel | | | 1700 | 2400 | 26/42 | 0 |
| 89 | 3000[d] | 375 | 300 | 8:1 | 13.3:1 | Good to fair gel | | | 300 | 500 | 7/24 | Trace |
| 90 | 3000[d] | 500 | 400 | 6:1 | 10:1 | Good to fair gel | | | — | — | 1/4 | 4 |
| 91 | 2000[k] | 200 | 200 | 10:1 | 25:1 | Good gel | | | 1000 | 1400 | 15/23 | 0 |

TABLE VI-continued
Correlation Of The Ratios SMQ/DiCr and CMC/DiCr With Gel Stability

| No. | SMQ* | DiCr | Na$_2$S$_2$O$_4$ | Ratio DiCr | Ratio DiCr | Apparent Viscosity(cp)&Gels[b] 10.2 Sec$^{-1}$ | 5.1 Sec$^{-1}$ | Gels | Apparent Viscosity(cp)&Gels[b] 10.2 Sec$^{-1}$ | 5.1 Sec$^{-1}$ | Gels | Vol.% Syneresis at 120° F |
|---|---|---|---|---|---|---|---|---|---|---|---|---|
| 92 | 3000[k] | 375 | 300 | 8:1 | 13.3:1 | Good gel | | | 750 | 900 | 9/17 | Trace |

*Sulfomethylated quebracho having a DSM of 150, unless otherwise noted.
[a]Control runs.
[b]Gel strength, lb./100 sq.ft. (after being quiescent for 10 seconds and then 10 minutes - see API Procedure RP 13B, Second Edition, April 1969).
[c]Not measurable.
[d]Sulfomethylated quebracho having a DSM of 85.
[e]Sulfomethylated Myrtan[+] (SMM) having a DSM of 39.
[f]Sulfomethylated Myrtan[+] (SMM) having a DSM of 90.
[g]Sulfomethylated Myrtan[+] (SMM) having a DSM of 180.
[h]Aged approximately 65 hours at 120° F.
[i]Aged 90 minutes at room temperature.
[k]Sulfomethylated quebracho having a DSM of 35.
DiCr = Na$_2$Cr$_2$O$_7$ . 2H$_2$O
[30] Myrtan is a flavotannin made from the bark and wood of the eucalyptus tree in the same general manner as quebracho extract; it is a product of Australia.

In considering the data in the above Table VI, and the data in the other examples, the following criteria have been employed in analyzing said data. In general, the gels can be classified into two groups: (1) "desirable gels"; and (2) "undesirable gels". For the purposes of this classification, a "desirable" gel is defined as one having not more than 2 percent syneresis, a measurable viscosity, and a measurable gel strength after having been aged overnight, e.g., about 14–15 hours, at 120° F. An "undesirable" gel is defined as one which lacks one or more of said properties.

Referring to the above Table VI, it will be noted that in about 70 percent of the runs wherein the SMQ/DiCr ratio was outside the range of 6.5:1 to 27.5:1, the resulting gel was an undesirable gel. It will also be noted that in over 60 percent of the runs wherein the CMC/DiCr ratio was less than 20:1, the resulting gel was an undesirable gel. In essentially all the runs wherein both of said ratios were outside said ranges, the resulting gel was an undesirable gel. In over 70 percent of the runs wherein both of said ratios were within said ranges, the resulting gel was a desirable gel. Thus, based on the data in said Table VI and the data set forth in connection with the other examples, and particularly the data in Table I, it is concluded that both of said ratios are important and that both should be considered in the practice of the invention. Based on the data set forth in said Table VI, it is further concluded that sulfoalkylated tannins having a degree of alkylation within the range of about 30 to about 190 can be used in the practice of the invention.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. In a method wherein a fluid medium is introduced into a borehole in the earth and into contact with a subterranean formation penetrated by said borehole, the improvement wherein at least a portion of said fluid medium comprises an aqueous gel, and wherein said gel comprises an aqueous brine having incorporated therein:
   a water-thickening amount of a water-soluble cellulose ether;
   a water-soluble compound of a polyvalent metal, wherein said compound of a polyvalent metal is a compound of chromium or manganese wherein the valence of the chromium therein is +6 and the valence of at least a portion of said chromium is reduced to +3 and wherein the valence of the manganese therein is +7 and the valence of at least a portion of said manganese is reduced to +4, in an amount which is sufficient to cause gelation of said aqueous brine containing said cellulose ether when the valence of at least a portion of said metal is reduced to said lower valence state;
   a water-soluble reducing agent in an amount which is effective to reduce at least a portion of said metal to said lower valence state and cause said gelation with the formation of said gel wherein said reducing agent is selected from the group consisting of sodium or potassium sulfite, sodium or potassium hydrosulfite, sodium or potassium metabisulfite, sodium or potassium bisulfite, sodium or potassium sulfide, sodium or potassium thiosulfate, hydrogen sulfide, thioacetamide, hydroquinone, p-hydrazinobenzoic acid, hydrazine phosphite, hydrazine dichloride, and mixtures thereof;
   a water-soluble sulfoalkylated tannin capable of, and in an amount sufficient for, increasing the stability of said gel to decomposition, with said amount being sufficient to provide a weight ratio of the amount of said sulfoalkylated tannin to the amount of said polyvalent metal compound which is effective to cause said sulfoalkylated tannin to be effective in increasing the stability of said gel wherein the tannin molecule in said sulfoalkylated tannin is alkylated with a significant amount of —C(R-)$_2$—SO$_3$M side chains wherein each R is selected from the group consisting of hydrogen and alkyl radicals containing from 1 to 5 carbon atoms, and M is selected from the group consisting of ammonium and the alkali metals, and said tannin is selected from the group consisting of the gallotannins and the flavotannins;
   wherein said amount of said cellulose ether is sufficient to provide a weight ratio of the amount of said cellulose ether to the amount of said polyvalent metal compound which is also effective to cause said sulfoalkylated tannin to be effective in increasing the stability of said gel, and
   wherein said weight ratio of the amount of said sulfoalkylated tannin to the amount of said polyvalent metal compound is within the range of from about 6.5:1 to about 27.5:1 and wherein said weight ratio of the amount of said cellulose ether to the amount of said polyvalent metal compound is at least about 20:1.

2. A method according to claim 1 wherein said aqueous gel comprises a said brine having incorporated therein:

an amount of said cellulose ether within the range of from 0.0025 to 10 weight percent, based upon the weight of said brine;

an amount of said polyvalent metal compound within the range of from 0.05 to 30 weight percent, based upon the weight of said cellulose ether; and an amount of said reducing agent within the range of from 0.1 to at least about 200 percent of the stoichiometric amount required to reduce said polyvalent metal to said lower polyvalent valence state.

3. A method according to claim 1 wherein said cellulose ether is a carboxymethyl cellulose ether.

4. A method according to claim 2 wherein said cellulose ether is a carboxymethyl cellulose ether.

5. A method according to claim 4 wherein:
said polyvalent metal compound is selected from the group consisting of ammonium chromate, ammonium dichromate, the alkali metal chromates and dichromates, chromium trioxide, and mixtures thereof; and
said sulfoalkylated tannin is a sulfomethylated quebracho having a degree of sulfomethylation within the range of from about 140 to about 160.

6. A method according to claim 2 wherein:
said cellulose ether is sodium carboxymethyl cellulose;
said polyvalent metal compound is sodium dichromate; and
said reducing agent is sodium hydrosulfite.

7. A method according to claim 5 wherein:
said brine has a total dissolved solids content of at least about 22,000 parts per million parts by weight and the concentration of divalent metal cations in said brine is not more than about 5,000 parts per million parts by weight;
said cellulose ether is sodium carboxymethyl cellulose, and the amount thereof is within the range of from 0.025 to 1 weight percent;
said polyvalent metal compound is either sodium dichromate or potassium dichromate, or a mixture thereof, and the amount thereof is within the range of from 0.5 to 20 weight percent;
said reducing agent is selected from the group consisting of sodium or potassium sulfite, sodium or potassium hydrosulfite, sodium or potassium metabisulfite, sodium or potassium thiosulfate, and mixtures thereof;
the weight ratio of the amount of said sulfomethylated quebracho to the amount of said polyvalent metal compound is within the range of from about 10:1 to about 20:1; and
the weight ratio of the amount of said cellulose ether to the amount of said polyvalent metal compound is within the range of from about 25:1 to about 100:1.

8. An aqueous gel, suitable for use as at least a portion of a fluid medium in a process wherein a said fluid medium is introduced into a borehole in the earth and into contact with a subterranean formation penetrated by said borehole, said gel comprising an aqueous brine having incorporated therein:
a water-thickening amount of a water-soluble cellulose ether;
a water-soluble compound of a polyvalent metal, wherein said compound of a polyvalent metal is a compound of chromium or manganese wherein the valence of the chromium therein is +6 and the valence of at least a portion of said chromium is reduced to +3 and wherein the valence of the manganese therein is +7 and the valence of at least a portion of said manganese is reduced to +4, in an amount which is sufficient to cause gelation of said aqueous brine containing said cellulose ether when the valence of at least a portion of said metal is reduced to said lower valence state;
a water-soluble reducing agent in an amount which is effective to reduce at least a portion of said metal to said lower valence state and cause said gelation with the formation of said gel wherein said reducing agent is selected from the group consisting of sodium or potassium sulfite, sodium or potassium hydrosulfite, sodium or potassium metabisulfite, sodium or potassium bisulfite, sodium or potassium sulfide, sodium or potassium thiosulfate, hydrogen sulfide, thioacetamide, hydroquinone, p-hydrazinobenzoic acid, hydrazine phosphite, hydrazine dichloride, and mixtures thereof;
a water-soluble sulfoalkylated tannin capable of, and in an amount sufficient for, increasing the stability of said gel to decomposition, with said amount being sufficient to provide a weight ratio of the amount of said sulfoalkylated tannin to the amount of said polyvalent metal compound which is effective to cause said sulfoalkylated tannin to be effective in increasing the stability of said gel wherein the tannin molecule in said sulfoalkylated tannin is alkylated with a significant amount of —C(R)$_2$—SO$_3$M side chains wherein each R is selected from the group consisting of hydrogen and alkyl radicals containing from 1 to 5 carbon atoms, and M is selected from the group consisting of ammonium and the alkali metals, and said tannin is selected from the group consisting of the gallotannins and the flavotannins;
wherein said amount of said cellulose ether is sufficient to provide a weight ratio of the amount of said cellulose ether to the amount of said polyvalent metal compound which is also effective to cause said sulfoalkylated tannin to be effective in increasing the stability of said gel and wherein
said weight ratio of the amount of said sulfoalkylated tannin to the amount of said polyvalent metal compound is within the range of from about 6.5:1 to about 27.5:1 and wherein
said weight ratio of the amount of said cellulose ether to the amount of said polyvalent metal compound is at least about 20:1.

9. An aqueous gel according to claim 8 wherein said aqueous gel comprises a said brine having incorporated therein:
an amount of said cellulose ether within the range of from 0.0025 to 10 weight percent, based upon the weight of said brine;
an amount of said polyvalent metal compound within the range of from 0.05 to 30 weight percent, based upon the weight of said cellulose ether; and
an amount of said reducing agent within the range of from 0.1 to at least about 200 percent of the stoichiometric amount required to reduce said polyvalent metal to said lower polyvalent valence state.

10. An aqueous gel according to claim 8 wherein said cellulose ether is a carboxymethyl cellulose ether.

11. An aqueous gel according to claim 9 wherein said cellulose ether is a carboxymethyl cellulose ether.

12. An aqueous gel according to claim 11 wherein:

said polyvalent metal compound is selected from the group consisting of ammonium chromate, ammonium dichromate, the alkali metal chromates and dichromates, chromium trioxide, and mixtures thereof; and said sulfoalkylated tannin is a sulfomethylated quebracho having a degree of sulfomethylation within the range of from about 140 to about 160.

13. An aqueous gel according to claim 9 wherein:

said cellulose ether is sodium carboxymethyl cellulose;

said polyvalent metal compound is sodium dichromate; and said reducing agent is sodium hydrosulfite.

14. An aqueous gel according to claim 12 wherein:

said brine has a total dissolved solids content of at least about 22,000 parts per million parts by weight and the concentration of divalent metal cations in said brine is not more than about 5,000 parts per million parts by weight;

said cellulose ether is sodium carboxymethyl cellulose, and the amount thereof is within the range of from 0.025 to 1 weight percent;

said polyvalent metal compound is either sodium dichromate or potassium dichromate, or a mixture thereof, and the amount thereof is within the range of from 0.5 to 20 weight percent;

said reducing agent is selected from the group consisting of sodium or potassium sulfite, sodium or potassium hydrosulfite, sodium or potassium metabisulfite, sodium or potassium thiosulfate, and mixtures thereof;

the weight ratio of the amount of said sulfomethylated quebracho to the amount of said polyvalent metal compound is within the range of from about 10:1 to about 20:1; and the weight ratio of the amount of said cellulose ether to the amount of said polyvalent metal compound is within the range of from about 25:1 to about 100.1.

* * * * *